Sept. 13, 1960          H. HURVITZ          2,952,808
FREQUENCY METER
Filed May 11, 1956
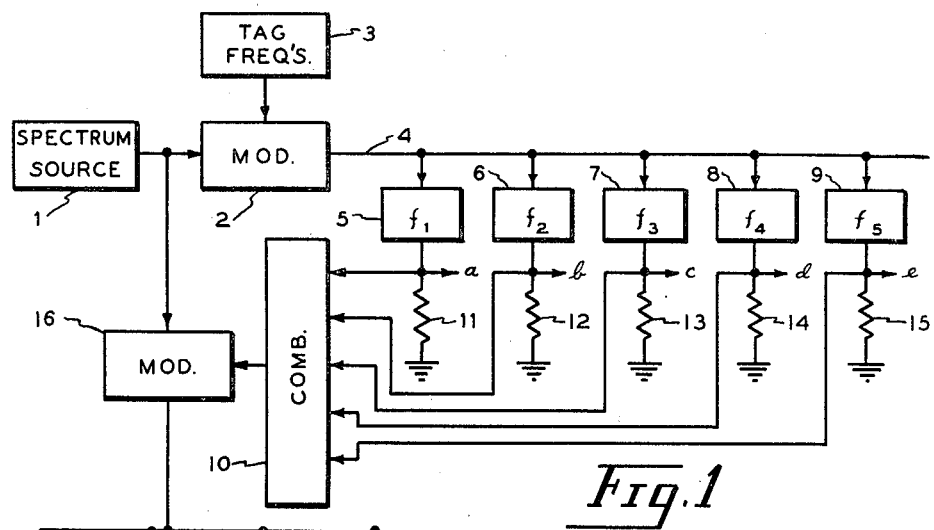
*Fig. 1*
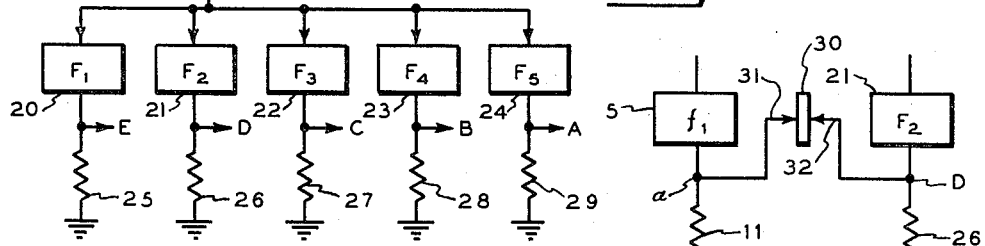
*Fig. 3*
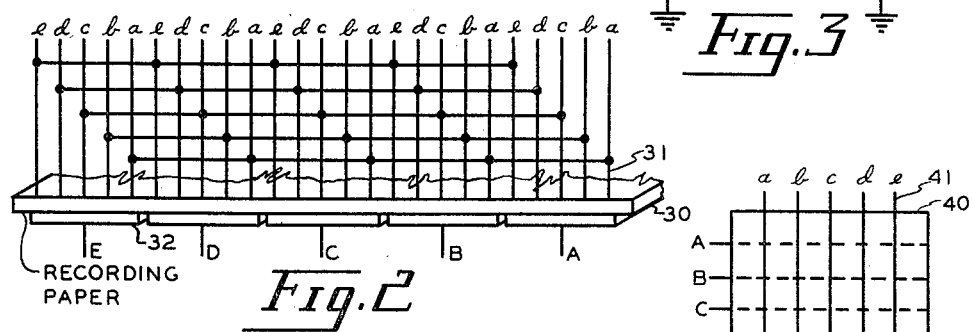
*Fig. 2*
*Fig. 4*
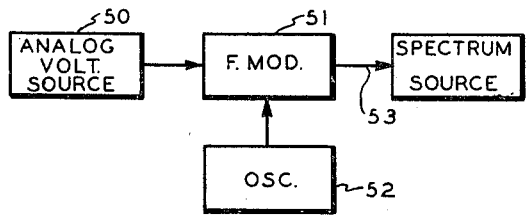
*Fig. 5*
INVENTOR
Hyman Hurvitz

United States Patent Office 2,952,808
Patented Sept. 13, 1960

2,952,808

FREQUENCY METER

Hyman Hurvitz, Warner Bldg., Washington, D. C.

Filed May 11, 1956, Ser. No. 584,254

19 Claims. (Cl. 324—79)

The present invention relates generally to frequency meters, and more particularly to systems for visually indicating and recording the frequency of a signal.

Systems for measuring frequency have long existed. Where high percentage accuracy has been required, such systems have generally been complex.

It is an object of the present invention to provide a system for measuring by means of plural filters and fixed oscillators a large number of frequencies.

It is another object of the invention to measure a large number of frequencies by means of a small number of filters, equal to approximately twice the square root of the number of frequencies.

It is another object of the invention to provide a novel multiple stylus recorder.

It is a further object of the present invention to provide a two dimensional system of frequency display employing an electroluminescent display panel.

The above and still further objects, features and advantages of the present invention will become apparent upon consideration of the following detailed description of one specific embodiment thereof, especially when taken in conjunction with the accompanying drawings, wherein:

Figure 1 is a functional block diagram of a frequency meter in accordance with the invention;

Figure 2 is a functional drawing recorder suitable for employment in the frequency meter of Figure 1;

Figure 3 is a circuit diagram of a recording element of the recorder of Figure 2;

Figure 4 is a functional drawing of an electro-luminescent indicator suitable for employment in the frequency meter of Figure 1; and Figure 5 is a functional block diagram of an amplitude to frequency converter suitable as a spectrum source for the frequency meter of Figure 1.

Referring now to the accompanying drawings, the reference numeral 1 denotes a source of signal, assumed to consist of one frequency at any one instant of time. This corresponds with a single frequency C.W. signal, the frequency of which may vary, or with multiple pulse signals having frequencies distributed over a spectrum, the pulses of different frequencies occurring in non-overlapping time relation.

The signal deriving from source 1 is applied to a modulator 2, to which is also applied a plurality of discrete frequencies, having a separation of F c.p.s. For example, if the source 1 may have any frequency in the band 75–99 kc., the discrete frequencies may be 5, 10, 15, 20 and 25 kc., deriving from a tag frequency source 3. The output of modulator 2 is applied to a lead 4, from which extend in parallel five filters 5, 6, 7, 8, 9. Each filter may have a pass band of 1 kc., the pass bands centered on frequencies $f1, f2, f3, f4, f5$, respectively, equal to 100, 101, 102, 103 and 104 kc. The several filters have their outputs combined in a combining or additive network 10, each filter developing an output across a load resistance, denoted as 11, 12, 13, 14, 15, respectively. An output lead is taken from each load, these being identified by small letters $a, b, c, d, e$, respectively.

The output of the combining network 10 consists then of one frequency at a time, depending on which of filters 5–9 inclusive passes current, and is applied to a modulator 16 to which is also applied the output of spectrum source 1.

To the output of modulator 16 is connected five filters 20, 21, 22, 23, 24, which are narrow band filters arranged to pass the tag frequencies, F1=5 kc., F2=10 kc., F3=15 kc., F4=20 kc. and F5=25 kc. The filters 20–24 are provided with output load resistances 25, 26, 27, 28, 29, respectively, from which are taken output leads denoted E, D, C, B, A.

Reviewing the operation of the system to this point, the signal source provides a carrier which is modulated by the tag frequencies F1 to F5. One and only one upper side band falls in the pass band of one of filters 5–9. For example, if the input frequency is 75 kc., the 25 kc. tag frequency combines therewith to generate a 100. kc. ($f1$) side-band, passed by filter 5.

The following table indicates possible input frequencies against tag frequencies, and energized filters:

| Input Frequencies | Tag Frequencies | |
|---|---|---|
| 75 | 25 | $f1$ |
| 76 | 25 | $f2$ |
| 77 | 25 | $f3$ |
| 78 | 25 | $f4$ |
| 79 | 25 | $f5$ |
| 80 | 20 | $f1$ |
| 81 | 20 | $f2$ |
| 82 | 20 | $f3$ |
| 83 | 20 | $f4$ |
| 84 | 20 | $f5$ |
| 85 | 15 | $f1$ |
| 86 | 15 | $f2$ |
| 87 | 15 | $f3$ |
| 88 | 15 | $f4$ |
| 89 | 15 | $f5$ |
| 90 | 10 | $f1$ |
| 91 | 10 | $f2$ |
| 92 | 10 | $f3$ |
| 93 | 10 | $f4$ |
| 94 | 10 | $f5$ |
| 95 | 5 | $f1$ |
| 96 | 5 | $f2$ |
| 97 | 5 | $f3$ |
| 98 | 5 | $f4$ |
| 99 | 5 | $f5$ |

When any signal passed by filters 5–9, inclusive, is recombined with the signal carrier, a conversion product will always exist equal to the tag frequency which selected the filter. For example, for an input frequency of 75 kc. the tag frequency is 25, and filter $f1$ is energized at 100. kc. The latter frequency combines with the input frequency to reconstitute the tag frequency, at 25 kc. For an input frequency of 76 kc. the tag frequency is 25, which generates a conversion product at 101 kc. passed by filter $f2$. The latter frequency combines with 76 kc. to generate the tag frequency of 25 kc.

The net result is that any input frequency is converted into a two bit code, consisting of two frequencies. The coding process is instantaneous.

It will be clear that any desired number of channels $f1 \ldots f5$ may be employed, provided these cover the band between two adjacent tag frequencies. The latter may have any desired separation, and one filter F1 ... F5 is required for each tag frequency.

In order to indicate the frequency significance of the code resort is had at will to a recorder or a visual indicator. The recorder is illustrated in Figure 2 and the indicator in Figure 4.

Referring now to Figure 2, the reference numeral 30 denotes a strip of Teledeltos (Registered Trademark) paper, or other voltage sensitive paper, which is driven by a motor (not illustrated) into the plane of the drawing. Superposed on the paper is a plurality of styli 31, the tip of each stylus 31 gently contacting the paper 39, and the tips separated, preferably by equal amounts. Under and in contact with the paper, and under the styli, is placed a plurality of mutually insulated platens 32, one for each tag frequency. The set of styli associated with each platen contains as many styli as there are channels $f1, f2 \ldots$. Counting from left to right, the first stylus of each set is connected to terminal $a$, the second set to terminal $b$, etc. The platens are connected respectively to terminals A, B, C, D, E. Voltage sensitive paper has the property that in the absence of some critical voltage no record occurs. The voltages applied to any one of styli $a, b, c \ldots$, or A, B, C $\ldots$ is insufficient of itself to effect recording. When voltage is applied to one styli $a, b, c \ldots$ and simultaneously to one of platens A, B, C $\ldots$, sufficient voltage exists across the paper to effect recording at the intersection. Accordingly, although five styli are energized for each input signal, say all the $a$ styli, or all the $b$ styli, etc., only that one of the five which is superposed on an energized platen actually records.

In order to provide a visual display resort is had to electroluminescence, employing the electroluminescent plate and electrodes taught by Piper, United States Patent No. 2,698,915. Identifying the plate by the reference numeral 40 spaced conductor strips 41 extend longitudinally of plate 40, on one side and spaced conductive strips 42 transversely on the other side. Electroluminescent phosphor then exists at every intersection point of strips 41, 42. By energizing one of strips 41, from one of output leads $a, b, c, d, e$, and one of strips 42, from one of output leads A, B, C, D, E (Figure 1) any selected intersection may be illuminated, since as in the case of Teledeltos paper a minimum exciting voltage is required, which is arranged to be adequate only when two intersecting strips are simultaneously energized.

While it may be desired to record or indicate frequencies incoming at random, it may occur that the frequency is controlled by an analog voltage, in which case the indication or record is representative of the analog voltage. Referring to Figure 5, an analog input voltage from source 50 is applied to a frequency modulator 51, which modulates the oscillator 52, to provide a spectrum source on lead 53. The spectrum may extend between 75–99 kc., and hence may be supplied as an input to the system of Figure 1.

It will be clear that the system of the invention may indicate decimally by employing ten frequencies $f1, f2 \ldots$, and that the number of frequencies $f1, f2 \ldots$ employed is a matter of choice, as is the number of tag frequencies.

As a general proposition if the number of $f$ frequencies equals the number of F frequencies, the complexity of the system is minimized for a given number of indications. The total number N of tag frequencies F is then equal to the square root of the total number of frequencies indicated, and 2N filters are required. The $f$ filters may overlap without ambiguity, while the F filters are single frequency filters, with adequate spacing therebetween. The system is accordingly, completely unambiguous, and provides instantaneous indications without manipulation or adjustment.

Certain modifications of the system will be obvious. For example, neon cell indicators may be connected to the leads $a, b, c, d, e$, A, B, C, D, E in which case twenty indicators will be adequate to indicate 100 frequency values.

While I have described and illustrated one specific embodiment of my invention, it will be clear that variations of the general arrangement and of the details of construction which are specifically illustrated and described may be resorted to without departing from the true spirit and scope of the invention as defined in the appended claims.

What I claim is:

1. A system for measuring a carrier frequency S existing at any position of a predetermined band, comprising means for modulating said carrier frequency S simultaneously with a plurality of tag frequencies F1, F2 $\ldots$ F$n$ separated by a frequency value F, a plurality of selective circuits coupled to said means for modulating said selective circuits having adjacent pass bands and covering together a frequency band of width F, and having center frequencies $f1, f2 \ldots fn$, respectively, where $f1, f2 \ldots fn$ are equal to conversion products of said carrier frequency S with only one of said tag frequencies F1, F2 $\ldots$ F$n$, and means coupled to said selective circuits for combining said frequencies $f1, f2 \ldots$ with said carrier frequency S to reconstitute said one of said tag frequencies F1, F2 $\ldots$ F$n$.

2. In a system for measuring a first frequency, means for converting said frequency to a plurality of at least four second frequencies only one of which falls within a predetermined fixed band, means coupled to said means for converting for measuring the frequency position of said only one frequency within said fixed band, and means coupled to said means for measuring for mixing said first frequency with a frequency at said frequency position to derive a further frequency.

3. In a system for meauring the frequency S, of a carrier signal, a source of a plurality of tag frequencies F1, F2 $\ldots$ F$n$ having equal spacings F, means coupled to said source for mixing S with F1, F2 $\ldots$ F$n$ to form multiple conversion products having said spacings F, means coupled to said means for mixing for further mixing only a selected one of said conversion products with said carrier signal to reconstitute that one of the frequencies F1, F2 $\ldots$ F$n$ which gave rise to the selected one of said conversion products.

4. In combination, a source of signal occurring at random within a band width $n$F c.p.s., where $n$ is an integer and F a frequency sub-band, a first heterodyne mixer, a local oscillator arranged to provide $n$ local oscillations at frequencies F1, F2, F3 $\ldots$ F$n$ c.p.s. spaced from one another at intervals F c.p.s., said local oscillator and said source of signals being coupled to said first heterodyne mixer in heterodyning relation, an array of intermediate frequency filters coupled in parallel to the output of said heterodyne mixer, the filters of said array having substantially zero overlap, and together extending totally across a band width F, a further heterodyne mixer, means for coupling said source of signals and the outputs of all said filters of said array in heterodyning relation to said further heterodyne mixer and additional filters each for selecting a different response of said further heterodyne mixer, said different responses occurring only at frequencies F1, F2, F3 $\ldots$ F$n$ c.p.s.

5. In combination, a superheterodyne receiver comprising a local oscillator, said local oscillator arranged and adapted to generate a plurality of frequencies simultaneously, said frequencies being spaced apart in frequency by equal amounts, said superheterodyne receiver including an intermediate frequency filter device, means for indicating the frequency position of a signal intercepted by said receiver with respect to the pass band of said filter device when said signal is converted to the pass band of said filter device by any one of said local oscillator frequencies, and heterodyne means responsive to signals passed by said filter device and to said signal intercepted by said receiver for indicating the identity of the local oscillator frequency which effected the conversion.

6. In a system for measuring the frequency of an input signal having a frequency falling within a first frequency band $n$F c.p.s. wide, where $n$ is an integer greater than unity and F is a number, means for converting said input signal regardless of its position in said first frequency band to a further signal having a frequency in a further frequency band of width F c.p.s., heterodyne means responsive to said input signal and said further signal for generating another signal indicative of the approximate frequency position of said input signal in said first frequency band, and means for indicating said approximate frequency position of said further signal in said further frequency band.

7. In a system for indicating the frequency position of an input signal in a wide band of frequencies which may be considered as constituted of a plurality of non-overlapping contiguous sub-bands, means for converting said input signal to a further signal of a frequency within a common band of frequencies having the width of one of said sub-bands regardless of the sub-band within which said input signal falls, and means for heterodyning said input signal with said further signal to generate another signal having a frequency representative of the sub-band within which said input signal falls.

8. The combination according to claim 7 wherein is further provided an indicator, and means responsive to said further signal and said another signal for providing a single indication representative of the frequency position of said input signal within one of said sub-bands and the location of said one of said sub-bands within said wide band of frequencies.

9. The combination according to claim 8 wherein said indicator is arranged to provide visual indications having two coordinates, one of said coordinates indicating said frequency position within one of said sub-bands and the other of said coordinates indicating said location of one of said sub-bands.

10. The combination according to claim 9 wherein said indicator is arranged to provide a visual indication having one coordinate representative simultaneously of said frequency position within one of said sub-bands, and of the location of said one of said sub-bands.

11. In a system for indicating frequency position of an input signal within a wide band of frequencies, wherein said wide band of frequencies may be considered to consist of a plurality of sub-bands which are adjacent and non-overlapping and have each a width $F$ c.p.s., a source of said input signal, an intermediate frequency filter system having a width $F$ c.p.s., means for converting said input signal to a frequency falling in the pass band of said filter system regardless of the position of said input signal in said wide band of frequencies, said last means comprising heterodyne mixer means having an input circuit coupled to said source of said input signal and having an output circuit coupled to said filter system, a further heterodyne mixer having input means coupled to said source of input signal and to said filter system, and means for deriving from said further heterodyne mixer a signal having a frequency representative of the sub-band occupied by said input signal.

12. In a system for converting a time varying voltage into an analogue visual indication of said voltage as a function of time, means for converting said time varying voltage into a signal of time varying frequency having a frequency value at each instant of time which is a function of the instantaneous amplitude of said voltage, said frequency varying over a wide band which may be considered to be constituted of a plurality of contiguous non-overlapping sub-bands of width $F$ c.p.s., means for continuously converting said frequency to a further frequency falling within a further band of frequencies of width $F$ c.p.s., and having a frequency position of said time varying frequency within one of said sub-bands, means for generating another signal having a frequency representative of the identity of the last named sub-band, and means for generating a recording having a position on a record receiver which represents the position of said frequency value within said wide band in response to said signal of time varying frequency and said another signal.

13. In a system for measuring the frequency of a signal within a wide band of frequencies, wherein said wide band of frequencies is divisible into a plurality of contiguous and non-overlapping sub-bands each of width $F$ c.p.s., means for heterodyning the frequency of an input signal occurring in any of said sub-bands to a further signal of frequency in one and the same intermediate frequency band, said intermediate frequency band having a width $F$ c.p.s., means for generating a first indication in response to and indicative of the position of said further signal within said intermediate frequency band, said means for heterodyning including a source of a plurality of local oscillator signals of frequencies having mutual separations of $F$ c.p.s., whereby some one only of said local oscillator signals heterodynes with said input signal to provide said further signal, and means for heterodyning said further signal with said input signal to derive a reflex signal of the frequency of said some one of said local oscillator signals, and means responsive to said reflex signal for providing a second indication representative of the identity of said some one of said local oscillator signals.

14. The combination according to claim 13 wherein said means for generating and providing indications is provided a visual indicator for providing a visual indication having two coordinates, said first indication being in one of said coordinates and said second indication being in the other of said coordinates.

15. A wave energy analyzing system comprising means for providing a wave energy signal subsisting anywhere in a predetermined wide frequency spectrum, heterodyne means for converting said wave energy signal into a further signal subsisting in a common relatively narrow band regardless of the frequency of said first mentioned wave energy signal in said wide spectrum, and frequency heterodyne means responsive to said further signal and to said wave energy signal for indicating the approximate position of said wave energy signal with respect to said spectrum.

16. A wave energy analyzing system comprising a source of a single wave energy signal subsisting at random anywhere in a predetermined wide frequency spectrum, heterodyne means comprising a plurality of local oscillator signals all of different frequencies for heterodyning said single wave energy signal simultaneously into plural further signals only one of which subsists in a relatively narrow band regardless of the frequency of said wave energy signal in said heterodyne spectrum, and means connected to said source and responsive to said wave energy signal and to said further signal subsisting in said relatively narrow band for indicating which of said local oscillator signals effected heterodyning of said wave energy signal to said one of said signals which subsists in said relatively narrow band.

17. In combination, a source of signals occurring at random anywhere within a band $S1$ to $S2$, means coupled to said source for converting separate segments of said band to a common sub-band of frequency having a width $F$ equal to $$\frac{S2-S1}{N}$$

where $N$ is an integer not equal to 1, means coupled to said first means for analyzing and indicating the frequency content of said sub-band, means coupled to said source and said second means for obtaining a conversion product of the frequency content of said sub-band with the frequency of said first mentioned signals and means for analyzing and indicating the frequency content of said conversion product.

18. In combination, a first source of input signal occurring anywhere within a predetermined wide band of frequencies, a second source of a plurality of locally generated oscillations, means coupled to said first and second sources for mixing said input signal with said plurality of locally generated oscillations, a single narrow band channel coupled to said means for mixing tuned for selecting conversion products of one only of said local oscillations with said input signal, and means coupled to said first source and said channel for converting signals selected by said channel with said input signal to derive a further signal at the frequency of said one only of said locally generated oscillations.

19. In an indicating system, a source of input signal occurring at random in a relatively wide frequency band consisting of a plurality of adjacent sub-bands of equal extent, means comprising a source of a plurality of auxiliary signals at equal frequency spacings arranged for converting said input signal from anywhere in any of said sub-bands to a further single signal within a single common relatively narrow frequency band, means for deriving a conversion product of said last named signal with said input signal, and means for indicating the frequency value of said conversion product and the frequency position of said further signal within one of said sub-bands.

References Cited in the file of this patent

UNITED STATES PATENTS

| | | |
|---|---|---|
| 1,976,481 | Castner | Oct. 9, 1934 |
| 2,001,387 | Hansell | May 14, 1935 |
| 2,084,760 | Beverage | June 22, 1937 |
| 2,093,871 | Levin | Sept. 21, 1937 |
| 2,510,531 | Trevor et al. | June 6, 1950 |
| 2,525,679 | Hurvitz | Oct. 10, 1950 |
| 2,738,462 | Troxel | Mar. 13, 1956 |
| 2,739,865 | Willey | Mar. 27, 1956 |
| 2,763,836 | Bullock | Sept. 18, 1956 |
| 2,779,654 | Williamson | Jan. 29, 1957 |
| 2,819,400 | Toth | Jan. 7, 1958 |